US009892135B2

(12) United States Patent
Li et al.

(10) Patent No.: US 9,892,135 B2
(45) Date of Patent: *Feb. 13, 2018

(54) OUTPUT DRIVEN GENERATION OF A COMBINED SCHEMA FROM A PLURALITY OF INPUT DATA SCHEMAS

(71) Applicant: International Business Machines Corporation, Armonk, NY (US)

(72) Inventors: Jeff J. Li, Boca Raton, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/501,955

(22) Filed: Sep. 30, 2014

(65) Prior Publication Data

US 2015/0019477 A1 Jan. 15, 2015

Related U.S. Application Data

(63) Continuation of application No. 13/801,524, filed on Mar. 13, 2013.

(51) Int. Cl.
*G06F 17/30* (2006.01)

(52) U.S. Cl.
CPC .. *G06F 17/30292* (2013.01); *G06F 17/30563* (2013.01)

(58) Field of Classification Search
CPC ......... G06F 17/30607; G06F 17/30292; G06F 17/30563; G06F 17/2247; G06F 17/2282; G06F 17/30557

USPC .................................................. 707/602, 803
See application file for complete search history.

(56) References Cited

U.S. PATENT DOCUMENTS

| 5,968,131 | A | * | 10/1999 | Mendez ................. G06Q 10/10 707/999.201 |
| 6,604,110 | B1 | | 8/2003 | Savage et al. |
| 7,111,075 | B2 | | 9/2006 | Pankovcin et al. |
| 7,437,378 | B2 | * | 10/2008 | Minium ............... G06F 17/2247 |
| 7,694,287 | B2 | | 4/2010 | Singh et al. |
| 7,720,873 | B2 | | 5/2010 | Loving et al. |
| 7,730,450 | B2 | * | 6/2010 | Mercer ............. G06F 17/30309 707/683 |
| 7,849,049 | B2 | | 12/2010 | Langseth et al. |
| 7,970,730 | B2 | | 6/2011 | Meijer et al. |
| 8,024,369 | B2 | | 9/2011 | Pellegrini et al. |
| 8,099,438 | B2 | | 1/2012 | Calahan |

(Continued)

OTHER PUBLICATIONS

Response to Office Action, dated Mar. 30, 2015, for U.S. Appl. No. 13/801,524, filed Mar. 13, 2013, invented by J.J. Li et al. Total 9 pages.

(Continued)

*Primary Examiner* — James Trujillo
*Assistant Examiner* — Fariborz Khoshnoodi
(74) *Attorney, Agent, or Firm* — Rabindranath Dutta; Konrad, Raynes, Davda and Victor LLP

(57) ABSTRACT

A computational device receives a plurality of versions of an input data schema. At least one element is selected from the plurality of versions of the input data schema based on an expected result. A combined schema is generated based on the at least one selected element. The input data is processed according to the combined schema.

7 Claims, 6 Drawing Sheets

(56) References Cited

U.S. PATENT DOCUMENTS

| | | | |
|---|---|---|---|
| 8,140,596 | B2 | 3/2012 | Brown et al. |
| 8,214,324 | B2 | 7/2012 | Joerg et al. |
| 2005/0187991 | A1 | 8/2005 | Wilms et al. |
| 2005/0251533 | A1 | 11/2005 | Harken et al. |
| 2007/0055655 | A1* | 3/2007 | Bernstein et al. ............... 707/3 |
| 2007/0074155 | A1 | 3/2007 | Ama et al. |
| 2007/0136324 | A1 | 6/2007 | Xu et al. |
| 2008/0059782 | A1* | 3/2008 | Kruse ...................... G06F 8/63 713/1 |
| 2008/0071817 | A1* | 3/2008 | Gaurav ..................... G06F 8/71 |
| 2008/0092037 | A1* | 4/2008 | Medi et al. ................... 715/237 |
| 2010/0189322 | A1* | 7/2010 | Sakagawa .................... 382/128 |
| 2010/0281061 | A1* | 11/2010 | Chen ............................ 707/794 |
| 2011/0055147 | A1 | 3/2011 | Joerg et al. |
| 2011/0219044 | A1* | 9/2011 | Peukert ........................ 707/805 |
| 2011/0295865 | A1 | 12/2011 | Carroll et al. |
| 2011/0320926 | A1 | 12/2011 | Agarwal et al. |
| 2012/0054147 | A1 | 3/2012 | Goetz et al. |
| 2012/0310875 | A1 | 12/2012 | Prahlad et al. |
| 2012/0323628 | A1 | 12/2012 | Jaster et al. |
| 2013/0110797 | A1* | 5/2013 | Campbell ......... G06F 17/30309 707/695 |
| 2013/0179769 | A1* | 7/2013 | Gurfinkel ............ G06F 17/2247 715/234 |
| 2013/0262496 | A1 | 10/2013 | Wong |
| 2014/0108437 | A1 | 4/2014 | Brown et al. |
| 2014/0188784 | A1 | 7/2014 | Guerra |

OTHER PUBLICATIONS

Response to Office Action, dated Apr. 7, 2015, for U.S. Appl. No. 14/502,205, filed Sep. 30, 2014, invented by S. Choudhary et al., Total 8 pgs.
Office Action, dated Dec. 29, 2014, for U.S. Appl. No. 13/801,524, filed Mar. 13, 2013, invented by Jeff J. Li et al., Total 30 pages.
Response to Office Action, for U.S. Appl. No. 13/801,556 dated Feb. 9, 2015, invented by S. Choudhary et al., Total 10 pages.
Office Action, dated Jan. 7, 2014, for U.S. Appl. No. 14/502,205, filed Sep. 30, 2014, invented by S. Choudhary et al., Total 25 pages.
US Patent Application, dated Mar. 13, 2013 for U.S. Appl. No. 13/801,524, filed Mar. 13, 2013, entitled "Output Driven Generation of a Combined Schema From a Plurality of Input Data Schemas", invented by Jeff J. li et al., Total 24 pages.
Preliminary Amendment, dated Sep. 30, 2014, for U.S. Appl. No. 13/801,524, filed Mar. 13, 2013, entitled "Output Driven Generation of a Combined Schema From a Plurality of Input Data Schemas", invented by Jeff J. li et al., Total 13 pages.
Office Action, dated Nov. 7, 2014, for U.S. Appl. No. 13/801,556, filed Mar. 13, 2013, invented by Shruti Choudhary et al., Total 28 pages.
Preliminary Amendment, dated Sep. 30, 2014, for U.S. Appl. No. 13/801,556, filed Mar. 13, 2013, entitled "Control Data Driven Modifications and Generation of New Schema During Runtime Operations", invented by S. Choudhary et al., Total 14 pages.
US Patent Application, dated Sep. 30, 2014, for U.S. Appl. No. 14/502,205, filed Sep. 30, 2014, entitled "Control Data Driven Modifications and Generation of New Schema During Runtime Operations", invented by S. Choudhary et al., Total 26 pages.
Preliminary Remarks, for U.S. Appl. No. 14/502,205, filed Sep. 30, 2014, entitled "Control Data Driven Modifications and Generation of New Schema During Runtime Operations", invented by S. Choudhary et al., Total 2 pages.
Response to Office Action, dated Sep. 4, 2015, for U.S. Appl. No. 13/801,556, filed Mar. 13, 2013, invented by invented by Shruti Choudhary et al., Total 15 pages.
Response to Final Office Action, dated Sep. 8, 2015, for U.S. Appl. No. 14/502,205, filed Sep. 30, 2014, invented by Shruti Choudhary et al., Total 13 pages.
Final Office Action, dated Jul. 16, 2015, for U.S. Appl. No. 13/801,524, filed Mar. 13, 2013, invented by Jeff J. Li et al., Total pages.
Final Office Action, dated Jun. 4, 2015, or U.S. Appl. No. 13/801,556, filed Mar. 13, 2013, invented by Shruti Choudhary et al., Total 22 pages.
Final Office Action, dated Jun. 5, 2015, or U.S. Appl. No. 14/502,205, filed Sep. 30, 2014, invented by Shruti Choudhary et al., Total 23 pgs.
Response to Final Office Action, dated Oct. 16, 2015, for U.S. Appl. No. 13/801,524, filed Mar. 13, 2013, invented by J.J. Li et al. Total 12 pages.
Notice of Allowance, dated Sep. 15, 2015, for U.S. Appl. No. 13/801,556, filed Mar. 13, 2013, invented by invented by Shruti Choudhary et al., Total 9 pages.
Office Action, dated Dec. 11, 2015, for U.S. Appl. No. 13/801,524, filed Mar. 13, 2013, invented by J.J. Li et al. Total 12 pages.
Notice of Allowance, dated Jan. 25, 2016, for U.S. Appl. No. 13/801,556, filed Mar. 13, 2013, invented by invented by Shruti Choudhary et al., Total 16 pages.
Notice of Allowance, dated Oct. 28, 2015, for U.S. Appl. No. 14/502,205, filed Sep. 30, 2014, invented by invented by Shruti Choudhary et al., Total 24 pages.
Notice of Allowance, dated Feb. 18, 2016, for U.S. Appl. No. 14/502,205, filed Sep. 30, 2014, invented by invented by Shruti Choudhary et al., Total 20 pages.
Response to Final Office Action, dated Jan. 6, 2017, for U.S. Appl. No. 13/801,524, filed Mar. 13, 2013, invented by Jeff J. Li et al., Total 13 pages.
Response to Final Office Action, dated Mar. 10, 2016, for U.S. Appl. No. 13/801,524, filed Mar. 13, 2013, invented by Jeff J. Li et al., Total 14 pages.
Final Office Action, dated Oct. 6, 2016, for U.S. Appl. No. 13/801,524, filed Mar. 13, 2013, invented by Jeff J. Li et al., Total 25 pages.
Office Action, dated Jun. 14, 2017, for U.S. Appl. No. 13/801,524, filed Mar. 13, 2013, invented by Jeff J. Li et al., filed Mar. 13, 2013,Total 26 pages.
Arnav, "Pentaho-kettle: Need to Create ETL Jobs Dynamically Based on User Input", [online], [Retrieved on Jan. 15, 2013]. Retrieved from the Internet at <URL: http://stackoverflow.com/questions/6610759/pentaho-kettle-need-to-create-etl-jobs-dynamically-based-on-user-input>, edited Jul. 21, 2011, Total 2 pp.
Bekwam, Inc., "Dynamic Schemes in Talend Open Studio", [online], [Retrieved on Feb. 11, 2013]. Retrieved from the Internet at <URL: http://bekwam.blogspot.com/2011/06/dynamic-schemas-in-talend-open-studio.html>, 2011 Bekwam, Inc., Jun. 22, 2011, Total 9 pp.
He, T. and M. Gudyka, "Build a Metadata-Driven ETL Platform by Extending Microsoft SQL Server Integration Services", [online]. Retrieved from the Internet at <URL: http://www.google.com/urlsa=t&rct=j&q=&esrc=s&source=web&cd=8 &ved=0CFAQFjAH&url=http%3A%2F%2Fdownload.microsoft. com%2Fdownload%2FD%2F2%2F0%2FD20E1C5F-72EA-4505-9F26-FEF9550EFD44%2FBuild%2520a%2520Metadata-Driven%2520ETL%2520Platform%2520by%2520Extending% 2520Microsoft%2520SQL%2520Servr%2520Integration% 2520Services.docx&usg=AOvVaw36VJtGXYmhg1hco2YX7zaY, SQL Server Technical Article, published Mar. 2008, total 12pp.
Wojciechowski, A., "E-ETL: Framework for Managing Evolving ETL Processes", CIKM 2011 Glasgow: PIKM11—Proc of the 2011 Workshop for Ph.D. Students in Information and Knowledge Management, Glasgow, Oct. 28, 2011, DOI: 10.1145/2065003.2065016, 2011 ACM, Total 7 pp.
U.S. Patent Application, filed Mar. 13, 2013, entitled "Control Data Driven Modifications and Generation of New Schema During Runtime Operations", invented by Choudhary, S., J.J. Li, and W.L. Nusbickel, Total 29 pp.
Response to Office Action, dated Sep. 14 ,2017, for U.S. Appl. No. 13/801,524 filed Mar. 13, 2013, invented by Jeff J. Li et al., Total 14 pages.
Notice of Allowance, dated Oct. 2, 2017, for U.S. Appl. No. 13/801,524 filed Mar. 13, 2013, invented by Jeff J. Li et al., Total 28 pages.

* cited by examiner

OUTPUT DRIVEN GENERATION OF A COMBINED SCHEMA FROM A PLURALITY OF INPUT DATA SCHEMAS

CROSS-REFERENCE TO RELATED APPLICATIONS

This application is a continuation of application Ser. No. 13/801524 filed on Mar. 13, 2013, which is incorporated herein by reference in its entirety.

BACKGROUND

1. Field

The disclosure relates to a method, system, and computer program product for an output driven generation of a combined schema from a plurality of input data schemas.

2. Background

An Extract, Transform and Load (ETL) job may be executed as a process in a database management system. During execution of the ETL job, data may be extracted from input data provided by input sources and transformed to fit operational needs. The transformed data may be loaded into a target, such as a database.

A schema refers to the structure of data described in a notation that is supported by a database management system. For example, a schema may indicate the organization of a table used to represent data. In certain situations, an input schema (also referred to as an input data schema) that describes the input data may be provided to an ETL job processor that process ETL jobs in a database management system. The input data is interpreted in accordance with the input schema to generate transformed data that is loaded into a target, where the transformed data may be referred to as an output.

ETL job processors that process ETL jobs may be driven by the input data received from input sources. In many situations, a single input schema that is fixed may be used by an ETL job processor to process the input data that is received from the input sources. In other situations, multiple input schema versions may be provided. In such situations, in order to parse the input data, a graphical user interface may be used to design one ETL job for each input schema version. That is, at job design time a user may be provided with schemas that describe input data and the user may select from among the schemas for each ETL component for a job, so that at runtime the ETL job processes input data based on the schemas that were provided to and selected by the user for the job design prior to runtime.

SUMMARY OF THE PREFERRED EMBODIMENTS

Provided are a method, system, and computer program product in which a computational device receives a plurality of versions of an input data schema. At least one element is selected from the plurality of versions of the input data schema based on an expected result. A combined schema is generated based on the at least one selected element. The input data is processed according to the combined schema.

In certain embodiments, streaming events are generated based on the combined schema.

In further embodiments, the streaming events correspond to tokens generated by a parser from the input data and the combined schema corresponds to a state machine, wherein processing input data according to the combined schema further comprises sending the streaming events from the parser to the state machine to validate incoming data and generate an output.

In additional embodiments, the generating of the combined schema is performed by an Extract Transform Load (ETL) component that executes in the computational device, and wherein the ETL component extracts information from the input data, transforms the information in conformance with operational needs, and generates an output.

In yet additional embodiments, the at least one selected element is a first element, wherein at least one of the plurality of versions of the input data schema include a second element that is not a part of the expected result. The second element is omitted from the combined schema.

In further embodiments, the generating of the combined schema based on the at least one selected element is performed by configuring the combined schema to have all elements corresponding to a schema of the expected result, wherein all the elements corresponding to the schema of the expected result are a subset of an union of each of the plurality of versions of the input schema.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Input and Output Driven ETL Job Processing

In certain designs of ETL job processors. streaming events are generated by parsers for the input data, and the state machine for processing the streaming events are generated based on the ETL job's input schema. However, in many situations, customers may be interested in extracting output data from the input data. and may not be particularly interested about the ETL job's input schema. An input schema dependent design may not be appropriate in such situations, because streaming events are generated for unused data elements. The state machine that is created based on the input schema describes not only the data used in the output but also the data that is not in the output, and such a state machine has features that are not needed by the customer.

In certain situations, customers may prefer to extract the data they are interested in from the input data. They may not be interested in any other data that may be present in the input data. If customers define another version of the input schema used in the ETL job design and the schema change does not affect the structure of the data elements of interest from the output, the ETL job should run and still produce the expected outputs. It may be even better if the ETL job supports multiple versions of the same input schema at the same time, whether or not the multiple versions affect elements of interest to the customer.

Certain embodiments provide mechanisms for an output driven ETL job processing that is not dependent on a fixed (i.e., static) input schema. In certain embodiments, a combined schema is designed to describe selected elements of the output from multiple versions of an input schema. The combined schema does not describe the elements that are not used in the output. The streaming parser generates the streaming events only for the elements contained in the combined schema. The state machine is also generated based on the combined schema, rather than being based on an input schema.

Exemplary Embodiments

Figure 1:
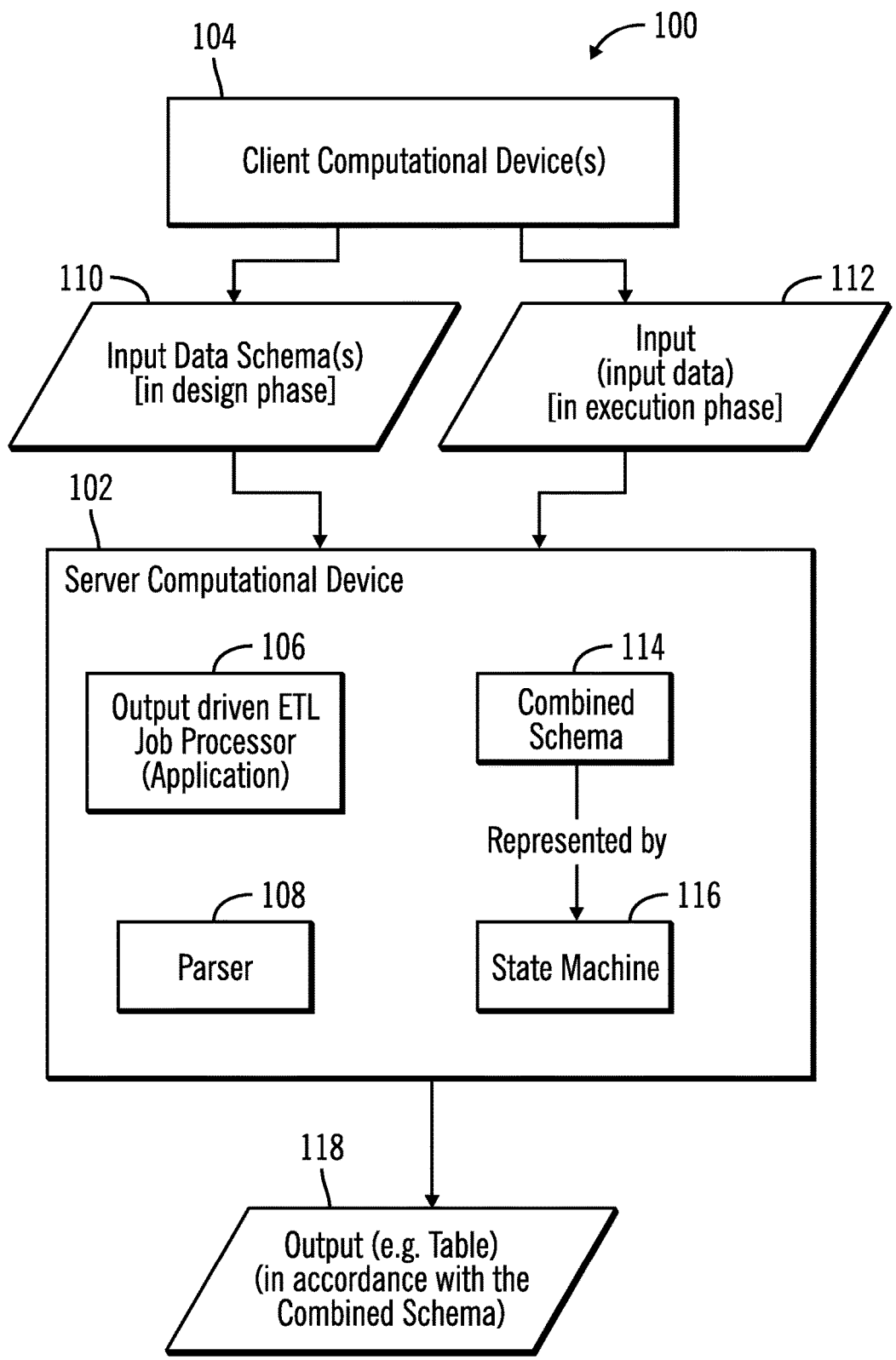
FIG. 1 illustrates a block diagram of a computing environment that includes a server computational device coupled to one or more client computational devices, in accordance with certain embodiments.

FIG. 1 illustrates a block diagram of a computing environment 100 that includes a server computational device 102 coupled to one or more client computational devices 104, in accordance with certain embodiments.

The server computational device 102 and the client computational device 104 may comprise any suitable computational device including those presently known in the art, such as, a personal computer, a workstation, a server, a mainframe, a hand held computer, a palm top computer, a telephony device, a network appliance, a blade computer, a storage server, a database server, etc. In certain embodiments, the server computational device 102 and the client computational device 104 may be coupled via a network, such as the Internet, an intranet, a storage area network, a local area network, etc.

The server computational device 102 includes an output driven ETL job processor 106 and a parser 108. The output driven ETL job processor 106 and the parser 108 are applications that may be implemented in software, firmware, hardware or any combination thereof.

The output driven ETL processor 106 receives one or more input data schemas 110 in the design phase, and one more inputs 112 in the execution phase, from the client computational device 104, for processing, and for generating an output 118, by transforming the inputs 112. The input data schemas 110 may also be referred to as input schemas, and the input 112 may be referred to as input data. The input data schemas 110 may describe the structure of the input data 112. The output driven ETL job processor 106 may also be referred to as an ETL component, where the ETL component extracts information from the input data schema 110 and the input data 112, transforms the information in conformance with operational needs, and loads the transformed information to generate an output.

In certain embodiments, the output driven ETL job processor 106 generates a combined schema 114 that is based on the one or more input data schemas 110 received from the client computational device 104. In certain embodiments, the combined schema 114 generated by the output driven ETL job processor 106 corresponds to a state machine 116.

Therefore FIG. 1 illustrates certain embodiments in which the ETL processor generates a combined schema 114 from a plurality of input schemas 110.

Figure 2:
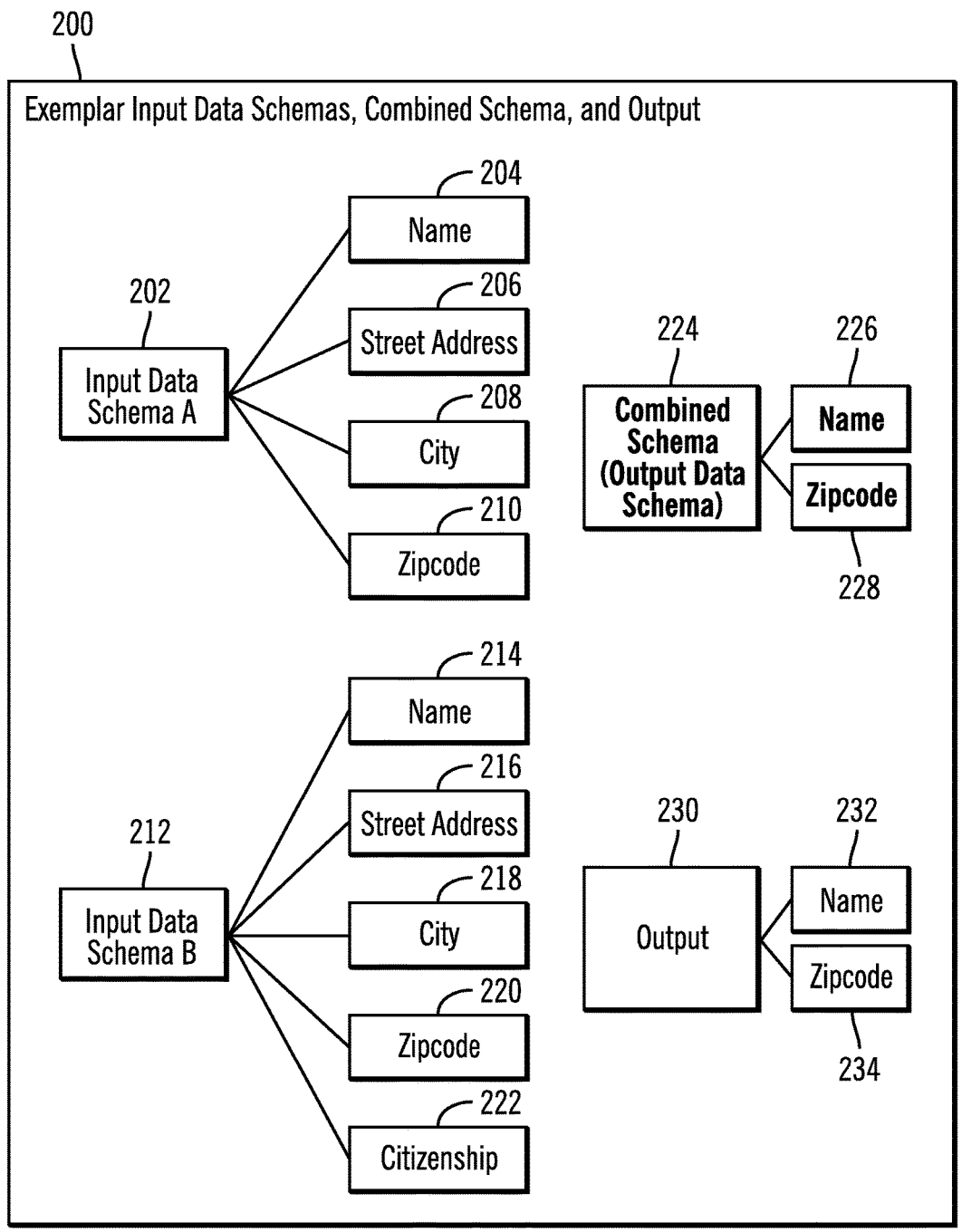
FIG. 2 illustrates a block diagram that shows exemplary input data schemas, a combined schema and an output, in accordance with certain embodiments.

FIG. 2 illustrates a block diagram 200 that shows exemplary input data schemas, a combined schema and an output, in accordance with certain embodiments.

The exemplary input data schema A 202 includes four elements that are as follows: "Name" 204, "Street Address" 206, "City" 208, and "Zipcode" 210. The exemplary input schema B 212 includes five elements that are as follows: "Name" 214, "Street Address" 216, "City" 218, "Zipcode" 220, and "Citizenship" 222. It can be seen that the "Citizenship" element 222 is present in input data schema 212 but is not present in input data schema 202.

In certain embodiments, in which a user is interested in output corresponding to the name and zipcode elements, and not interested in the other elements, the output driven ETL job processor 106 generates a combined schema 224 that has the elements "Name" 226 and "Zipcode" 228. In combination with the parser 108, during the execution phase, the state machine 116 that may correspond to the combined schema 224, processes the input 112 and generates an output 230 that includes the name 232 and zipcode 234 values. An exemplary output 230 may be as follows:

| | |
|---|---|
| John Smith | 90016 |
| Jane Brown | 90035 |
| Peter Williams | 90001. |

The exemplary output 230 may be generated from exemplary input data that may include not only the name and zipcode, but also the street address, city, and citizenship information which may not be of interest to a user and are therefore not included in the output 230 by the output driven ETL job processor 106.

Therefore, FIG. 2 illustrates certain embodiments in which the combined schema 224 that is created is based on the output 230. Since the output 230 only has name and zipcode, only these two elements are included in the combined schema 224. The other elements like street address, city, citizenship that are present in the input data schemas 202, 212 are disregarded.

In FIG. 2 it may be noted that an expected result (i.e., the output 230) includes values corresponding to at least a first element (such as the "zipcode"). At least one of the plurality of versions 202, 212 of the input data schema includes a second element (such as "citizenship" 222 in input data schema 212 or "city" 208, 218 in the input data schemas 202, 212) that is not a part of the expected result (i.e., the output). Inclusion of at least the second element in the combined schema 224 is avoided. Therefore, the parser 108 and the state machine 116 may disregard elements that are not needed in the output 230.

Also in FIG. 2, the generating of the combined schema 224 based on at least one element (e.g., "zipcode" 228 and/or "name" 228) is performed by configuring the combined schema 224 to have all elements corresponding to a schema of the expected result 230, where all the elements corresponding to the schema of the expected result are a subset of an union of each of the plurality of versions of the input schema. For example, the union of the input data schemas A 202 and B 212 are "name", "street address", "city", "zipcode" "citizenship", and the elements "name" and "zipcode" corresponding to the output 230 is a subset of the union of the input data schemas A 202 and B 212.

Figure 3:
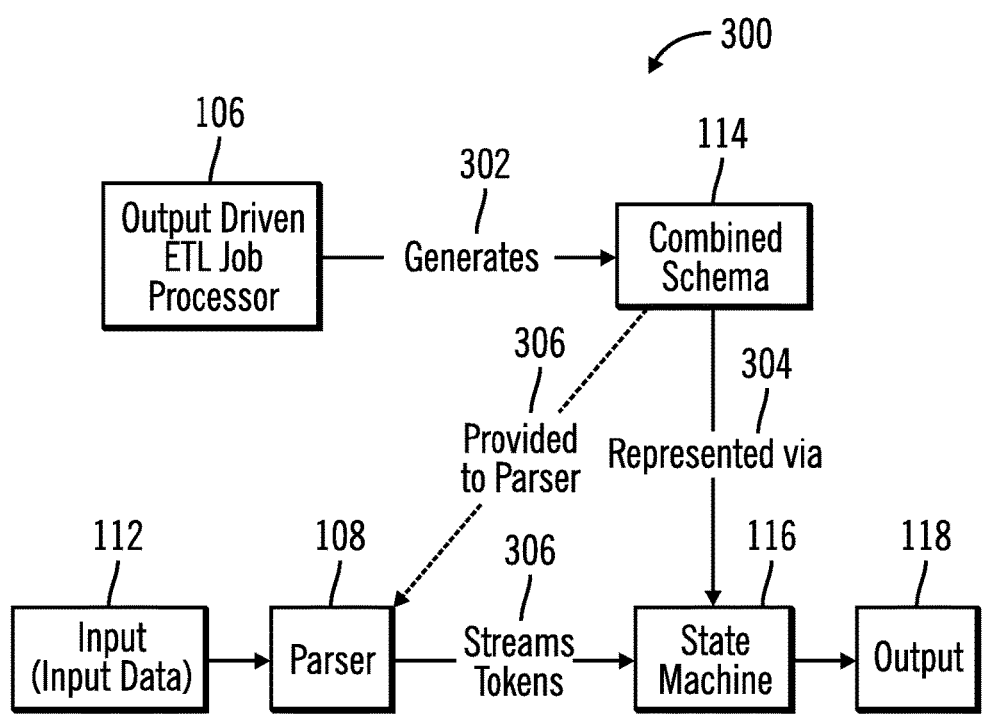
FIG. 3 illustrates a block diagram that shows how an output driven ETL job processor that executes in the server computational device generates a combined schema that is represented via a state machine, where the state machine generates an output based on streamed tokens from a parser, in accordance with certain embodiments.

FIG. 3 illustrates a block diagram 300 that shows how an output driven ETL job processor 106 that executes in the server computational device 102 generates a combined schema 114 that corresponds to a state machine 116, where state machine 116 generates an output 118, in accordance with certain embodiments.

In certain embodiments, the output driven ETL job processor 106 generates (reference numeral 302) a combined schema 114 from a plurality of input schemas 110. The combined schema 114 is represented (reference numeral 304) via a state machine 116 in the server computational device 102, such that ETL job processor 106 generates output 118 according to schema 114 via state machine 116. (Since state machine 116 generates output 118 conforming to schema 114, it may be said that state machine 116 "represents" schema 114.)

The input 112 (i.e., input data, that is received by the server computational device 102 from the client computational device 104) is parsed by the parser 108, where the parser streams tokens 206 in a sequential mode as the input 112 is parsed. It should be noted that the parser 108 may be provided (reference numeral 306) with the combined schema 114 to stream tokens for only the elements supported by the combined schema. The streamed tokens 306 are processed by the state machine 116 to generate the output 118.

Figure 4:
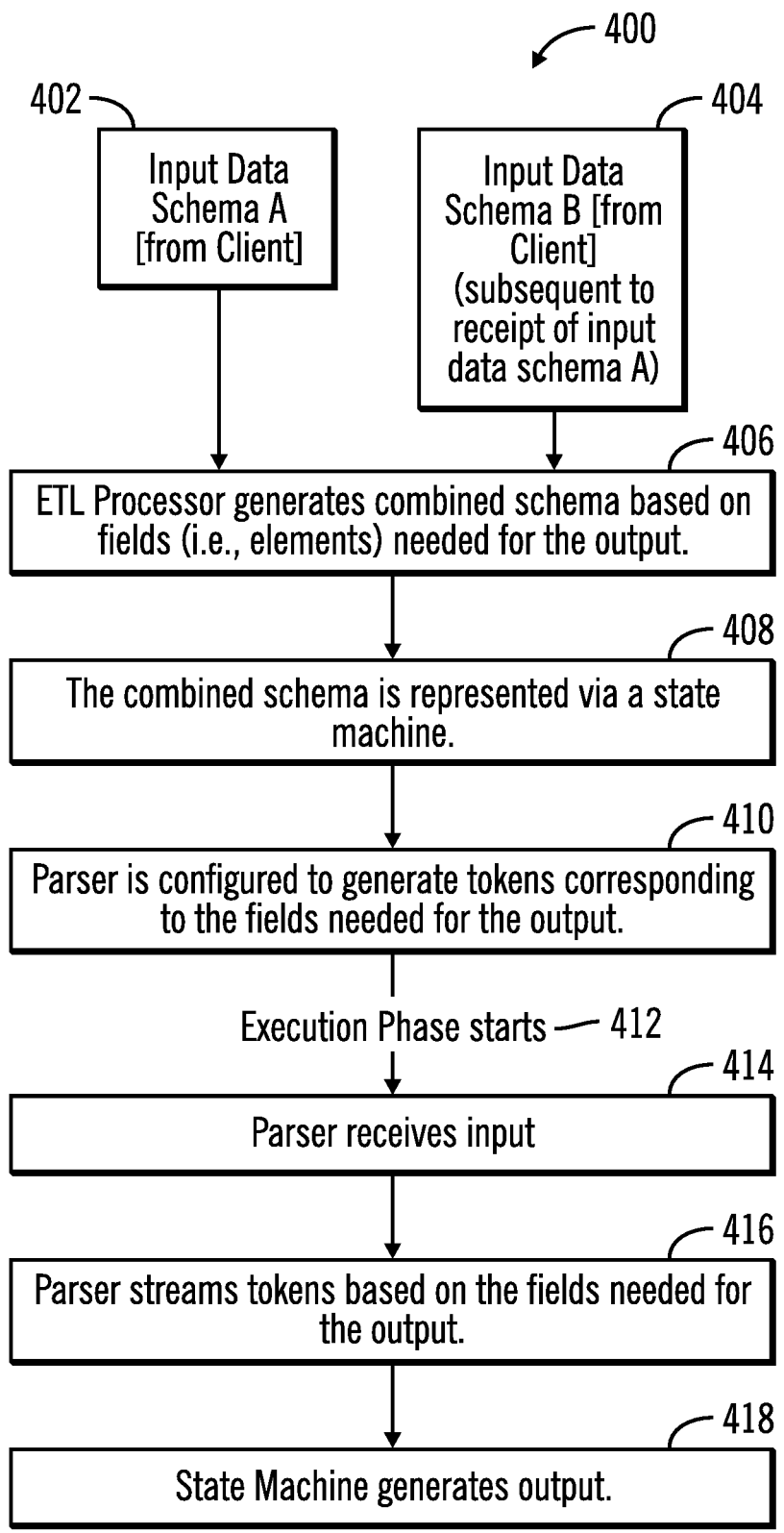
FIG. 4 illustrates a first flowchart that shows operations performed in accordance with certain embodiments.

FIG. 4 illustrates a first flowchart 400 that shows operations performed in accordance with certain embodiments. The operations shown in FIG. 4 may be performed via the output driven ETL job processor 106, the parser 108 and the state machine 116 that are implemented in the server computational device 102.

Control starts at block 402 in which the server computational device 102 receives the input data schema A 202 from the client computational device 104. The server computational device 102 receives (at block 404) the input data schema B 212 subsequent to receiving the input data schema A 202. The input data schema B 212 may have more or less elements or different elements that the input data schema A 202.

Control proceeds to block 406 where the output driven ETL job processor 106 generates the combined schema 114 based on fields (i.e., elements) needed for the output 118. The combined schema 114 is represented (at block 408) via a state machine 116.

From block 408 control proceeds to block 410 in which the parser 108 is configured to generate tokens corresponding to the fields needed for the output 118. Fewer tokens may be generated as the parser 108 configuration mechanism is provided with information included in the combined schema 114.

At the conclusion of block 410, the execution phase may start (shown via reference numeral 412). In the execution phase, the parser 108 that executes in the server computational device 102 may receive (at block 414) the input 112 (i.e., the input data) from the client computational device 102. The parser 108 streams (at block 416) tokens based on the fields that are needed for the output 118 and the state machine generates (at block 418) the output 118.

Therefore, FIG. 4 illustrates certain embodiments in which processing by state machine and parser is based on a combined schema 114 that is based on elements that are expected in the output 118.

Figure 5:
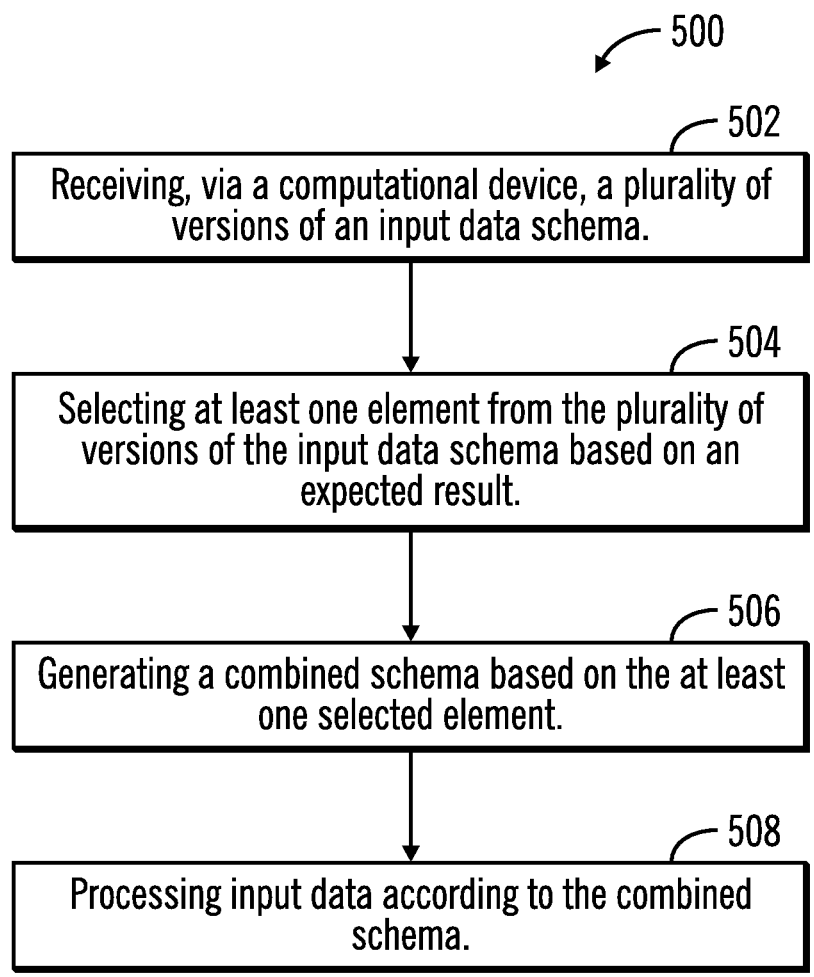
FIG. 5 illustrates a second flowchart that shows operations performed in accordance with certain embodiments.

FIG. 5 illustrates a second flowchart 500 that shows operations performed in accordance with certain embodiments. The operations shown in FIG. 5 may be performed via the output driven ETL job processor 106, the parser 108 and the state machine 116 that are implemented in the server computational device 102.

Control starts at block 502 in which a computational device, such as the server computational device 102, receives a plurality of versions of an input data schema. For example, the plurality of versions of the input data schema may include the input data schema A 202 and the input data schema B 212.

Control proceeds to block 504, in which at least one element is selected from the plurality of versions of the input data schema based on an expected result. For example, if the output 118, 230 is expected to show at least the name, then the "Name" element may be selected from the plurality of versions of the input data schema.

A combined schema 114 is then generated (at block 506) based on the at least one selected element. For example, the combined schema 224 that is based on at least the "Name" element is shown as being generated in FIG. 2. The input data 112 is then processed (at block 508) according to the combined schema 114.

Therefore FIGS. 1-5 illustrate certain embodiments, in which an ETL job processor generates a combined schema from a plurality of input schemas based on the output that is expected. Other elements that are not pertinent towards the generation of the output may be absent in the combined schema, even if such elements may be present in the plurality of input schemas. Input data is processed in accordance with the combined schema to generate the output.

Further Details

Certain embodiments provide an ETL job design to process data described by multiple versions of the same schema. Users only need to maintain one ETL job for various versions of a schema. Certain embodiments improve the overall parsing performance by discarding the unused data at the streaming parser, by reducing the size of the state machine, and by reducing the number of the streaming events processed by the state machine.

Certain embodiments provide a mechanism to drive an ETL job's parsing process by the output, rather than by the input schema. Customers may want to extract the data they are interested in from the input data. They may not be interested in the other data that may be present in the input data. If customers define another version of the input schema used in the ETL job design and the schema change does not affect the structure of the data elements of interest from the output, the ETL job should run in certain embodiments, and still produce the expected outputs. Certain embodiments also support multiple versions of the same input schema at the same time, whether the affected elements are of interest to the customer or not.

Additional Embodiment Details

The described operations may be implemented as a method, apparatus or computer program product using standard programming and/or engineering techniques to produce software, firmware, hardware, or any combination thereof.

Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
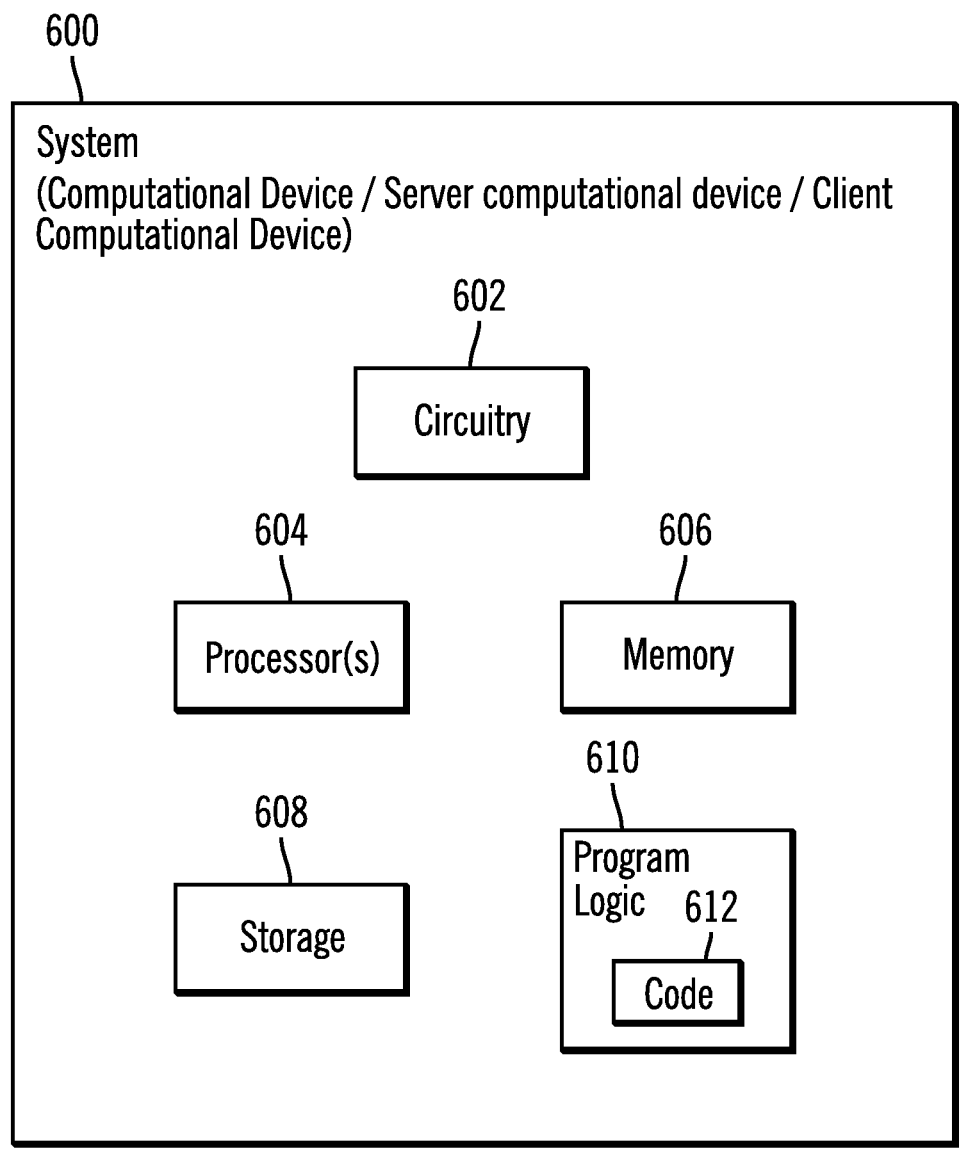
FIG. 6 illustrates a block diagram of a computational system that shows certain elements that may be included in at least the server computational device that executes the output driven ETL processor, and the client computational device of FIG. 1, in accordance with certain embodiments.

FIG. 6 illustrates a block diagram that shows certain elements that may be included in the server computational device 102, and the one or more client computational devices 104, in accordance with certain embodiments. The system 600 may comprise the server computational device 102 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving, via a computational device, a first version of an input data schema comprising a first plurality of elements and a second version of the input data schema comprising a second plurality of elements;
    in response to determining that a user is interested in an output corresponding to selected elements of elements that are present in both the first plurality of elements and the second plurality of elements, and is not interested in outputs corresponding to other elements that are present in the first plurality of elements or the second plurality of elements, performing a selection of the selected elements, wherein the selected elements are common to the first version and the second version of the input data schema but are fewer in number than at least one of the first plurality of elements and the second plurality of elements, based on an expected result corresponding to the selected elements;
    generating, by an Extract Transform Load (ETL) component, a combined schema from the first version of the input data schema and the second version of the input data schema, wherein the combined schema includes the selected elements and no other elements;
    in response to generating the combined schema, processing input data according to the combined schema to generate an output by generating and sending streaming events based on the combined schema from a parser to a state machine to validate incoming data and generate the output, wherein the streaming events correspond to tokens generated by the parser from the input data, and the combined schema corresponds to the state machine; and
    during the processing of the input data according to the combined schema, performing:
        defining another version of the input data schema, wherein the another version does not affect a structure of elements of interest from the output; and
        in response to defining the another version of the input data schema, the ETL component continues to execute and still generates the output in accordance with the combined schema.

2. The method of claim 1, wherein unused data is discarded at the parser.

3. The method of claim 1, wherein the ETL component extracts information from the input data, transforms information in conformance with operational needs, and generates the output.

4. The method of claim 1, wherein the generating of the combined schema further comprises:
    configuring the combined schema to have all elements corresponding to a schema of the expected result, wherein all the elements corresponding to the schema of the expected result are a subset of an union of each of the first version and the second version of the input data schema.

5. The method of claim 1, wherein the selected elements include a first element that is of interest to the user, wherein the first element has an identical name in each of the first version and the second version of the input data schema, wherein the user desires an output based on the first element, wherein at least one of the first version and the second version of the input data schema include a second element, and wherein the user does not want an output based on the second element.

6. The method of claim 5, wherein the second element is omitted from the combined schema.

7. The method of claim 1, wherein the parser and the state machine disregards elements that are not needed in the output, and wherein the user maintains only one ETL component.

* * * * *